US007793686B2

(12) United States Patent
Lee

(10) Patent No.: US 7,793,686 B2

(45) Date of Patent: Sep. 14, 2010

(54) OVERPRESSURE SAFETY APPARATUS OF GAS FUEL CONTAINER

(75) Inventor: Young-Seok Lee, Namyangju (KR)

(73) Assignee: Joon-Hyuk Jang, Soosung-Gu, Daegu (KR)

( * ) Notice: Subject to any disclaimer, the term of this patent is extended or adjusted under 35 U.S.C. 154(b) by 1157 days.

(21) Appl. No.: 10/544,859

(22) PCT Filed: Jan. 30, 2004

(86) PCT No.: PCT/KR2004/000164

§ 371 (c)(1),
(2), (4) Date: May 15, 2006

(87) PCT Pub. No.: WO2004/070260

PCT Pub. Date: Aug. 19, 2004

(65) Prior Publication Data

US 2006/0237067 A1 Oct. 26, 2006

(30) Foreign Application Priority Data

Feb. 4, 2003 (KR) ..................... 10-2003-0006721

(51) Int. Cl.
*F16K 24/00* (2006.01)

(52) U.S. Cl. ...................................... 137/588; 222/397

(58) Field of Classification Search ................. 137/588, 137/587, 206, 209; 251/144; 222/397, 402.16, 222/402.17, 402.19

See application file for complete search history.

(56) References Cited

U.S. PATENT DOCUMENTS

| | | | | |
|---|---|---|---|---|
| 3,759,291 | A * | 9/1973 | Moore et al. | 137/588 |
| 3,951,314 | A * | 4/1976 | Toro | 222/402.17 |
| 5,183,189 | A * | 2/1993 | Baudin | 222/397 |

FOREIGN PATENT DOCUMENTS

| | | |
|---|---|---|
| KR | 2001-0107218 | 12/2001 |
| WO | WO02/084169 A1 | 10/2002 |
| WO | WO 02084169 A1 * | 10/2002 |

* cited by examiner

*Primary Examiner*—John Rivell
*Assistant Examiner*—Andrew J Rost
(74) *Attorney, Agent, or Firm*—Tutunjian & Bitetto P.C.

(57) ABSTRACT

An overpressure safety apparatus having a fuel container body and a mounting cap includes a main housing coupled to the mounting cap, the main housing having an elbow-shaped gas introducing passage, a valve stem disposed in the main housing through the mounting cap. The valve stem is provided with an orifice, an opening/closing seal inserted between a top of the main housing and the mounting cap to selectively open/close the orifice of the valve stem. A sub-housing is connected to a bottom of the main housing, and has a branch line communicating with the gas introducing passage and a receiving cavity with a bottom communicating with the branch line and a top communicating with an exhausting hole formed on the mounting cap. A safety valve is disposed in the receiving cavity to selectively open the branch line in response to variations of internal pressure of the container.

14 Claims, 11 Drawing Sheets

OVERPRESSURE SAFETY APPARATUS OF GAS FUEL CONTAINER

TECHNICAL FIELD

The present invention relates to an overpressure safety apparatus of a gas fuel container, and more particularly, to an overpressure safety apparatus of a gas fuel container, which can prevent the gas fuel container from exploding by exhausting overpressure gas out of the gas fuel container using a safety valve selectively opening a branch line in response to internal pressure of the container due to external high temperature.

BACKGROUND ART

Generally, a gas fuel container used for a portable gas burner is filled with liquefied gas. The liquefied gas is sprayed out of the fuel container by internal gas pressure regularly maintained in the gas fuel container.

However, the internal gas pressure may be increased at a high temperature, causing an inadvertent accident such as the deformation and explosion of the fuel container. For example, when the fuel container is exposed to, for example, the heat of summer, since the internal pressure of the fuel container is excessively increased, an inadvertent accident such as the explosion of the container may be incurred. Furthermore, when cooking is performed with a pot having a bottom wider than the portable gas burner, excessive radiant heat spreads out along the bottom of the pot to reach the gas fuel container. As a result, a temperature of the fuel container is increased to increase the internal pressure of the fuel container, resulting in the explosion of the container.

FIGS. 1 to 3 show a conventional gas fuel container.

As shown in the drawings, a conventional gas fuel container 100 includes a main body 99 and a mounting cap 101 mounted on a top of the main body 99. The mounting cap 101 is provided at a central portion with a projected coupling portion 102 in which a valve stem 103 and a housing 104 are coupled. A spring 105 being disposed in the housing 104 elastically supports the valve stem 103 upward. An opening/closing seal 106 is disposed between a top of the housing 104 and the coupling portion 102 of the mounting cap 101.

A gas spraying hole 107 is defined by an upper-inner cavity of the valve stem 103. A concave portion 108 is formed on an outer circumference of the valve stem 103. An orifice 109 is formed through the concave portion 108 of the valve stem 103. The inner circumference of the opening/closing seal 106 is tightly fitted around the concave portion 108 so that the orifice 109 can be selectively opened and closed in response to external force to exhaust the internal gas.

A predetermined level of internal pressure regularly acts in the gas fuel container to spray the gas to an external side. However, when the internal pressure is increased by the external heat, an inadvertent accident may be incurred due to a risk such as the deformation and explosion of the container.

Therefore, to prevent such an accident there is provided a conventional safety apparatus against excessive internal pressure as shown in FIG. 4.

As shown in the drawing, a housing 202 is coupled to a center of a mounting cap 201 and a valve stem 203 is installed in the housing 202. An over pressure safety spring 204 and a supporting spring 205 are disposed in the housing 202 to elastically support the valve stem 203. Disposed on a hook step 202*a* of the housing 202 is an opening/closing seal 202*a* on which a spring seat 207 is disposed.

The opening/closing seal 206 is tightly fitted around a concave portion 203*a* of the valve stem 203 to selectively open an orifice 208 formed through the valve stem 203. The spring seat 207 is fitted around the valve stem 203 and is biased by the over pressure safety spring 204 to allow the opening/closing seal 206 to tightly contact the hook step 202*a*.

In the above-described safety apparatus, in order to exhaust or fill gas out of or in the container 200, when external force is applied to push down the valve stem 203 as shown in FIG. 5, the supporting spring 205 is compressed and the orifice 208 blocked by the opening/closing seal 206 is opened, thereby allowing the gas to be exhausted out of or filled in the container 200.

Meanwhile, when the internal pressure of the container 200 is increased to be higher than the elastic force of the over pressure safety spring 204, as shown in FIG. 6, the over pressure safety spring 204 is compressed and the valve stem 203 is moved upward. As a result the opening/closing seal 206 is separated firm the hook step 202*a* to define a gas exhaust path. The gas forming the excessive internal pressure is exhausted through the gas exhaust path and an inner cavity of the housing 202, thereby lowering the internal pressure to prevent the explosion of the container 200.

However, since the above-described safety apparatus is designed such that the gas is introduced into the container only through the orifice 208 in the course of filling the gas into the container (an opposite direction of the arrow in FIG. 5), the filling efficiency is deteriorated as compared with a filling structure of a conventional fuel container shown in FIG. 3.

Meanwhile, as shown in FIG. 5, when the gas spray pressure is increased above a predetermined level (6 $kg_f/cm^2$ for a butane gas container) in use, a governor is operated to cut off the spray of the gas and to separate the container 200 from the gas burner. In this state, when the internal pressure of the container 200 is increased above a predetermined level (14 $kg_f/cm^2$ for a butane gas container), the valve stem 203 is moved upward (see FIG. 6) to reduce the internal pressure.

However, when the container 200 is maintained without being separated from the gas burner due to, for example, the malfunction of the governor, since the valve stem 203 cannot be moved upward, the opening/closing seal 206 maintain closely to contact the hook step 202*a*. As a result, the internal over pressure gas cannot be exhausted, causing the container 200 to be exploded.

In addition, the safety apparatus is designed such that the internal over pressure gas is exhausted by moving the valve stem 203 installed in the housing 202, an overall length of the valve stem 203 and the housing 202 is increased by the moving distance, thereby increasing the costs of the assembling parts.

SUMMARY

Accordingly, the present invention is directed to a safety apparatus of a gas fuel container that substantially obviates one or more problems due to limitations and disadvantages of the related art.

An object of the present invention is to provide a safety apparatus of a gas fuel container that can prevent the explosion of the container by opening a branch line, which extends from a sub-housing and communicates with a gas introducing passage of a main housing, by operating a safety valve installed in the sub-housing when internal pressure is excessively increased, while not deteriorating filling efficiency.

Another object of the present invention is to provide a safety apparatus that can prevent gas from being needlessly exhausted by blocking a branch line by returning the safety valve to an initial location when internal gas pressure is reduced to a predetermined level.

A further object of the present invention is to provide a safety apparatus that can reduce manufacturing costs and can be employed to an existing assembling line for assembling a gas fuel container not having a safety apparatus by not changing a design of a conventional filling structure but by simply installing a safety valve in a sub-housing integrally formed with a main housing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an overpressure safety apparatus of a gas fuel container having a container body and a mounting cap mounted on a top of the container, the safety apparatus comprising a main housing coupled on the mounting cap, the main housing having an elbow-shaped gas introducing passage; a valve stem disposed in the main housing through the mounting cap and biased by a first spring disposed in the main housing, the valve stem being provided with an orifice; an opening/closing seal inserted between a top of the main housing and the mounting cap to selectively open/close the orifice of the valve stem; a sub-housing connected to a bottom of the main housing, the sub-housing having a branch line communicating with the gas introducing passage and a receiving cavity with a bottom communicating with the branch line and a top communicating with an exhausting hole formed on the mounting cap; and a safety valve disposed in the receiving cavity to selectively open the branch line in response to variation of internal pressure of the container.

According to an embodiment of the present invention, the safety valve comprises an opening/closing member installed on the bottom of the receiving cavity to selectively open the branch line, a second elastic member installed in the receiving cavity and seated on the opening/closing member, and a seal ring disposed on the top of the receiving cavity and inserted between a top of the elastic member and the mounting cap.

Preferably, the second elastic member is formed of a cylindrical coil spring.

The opening/closing member is provided at a top with a supporting boss for supporting a lower end of the elastic member to prevent the elastic member from deforming in a lateral direction.

Preferably, the bottom surface is provided with a circular projection having a diameter larger than an inner diameter of the branch line, and the seal ring is formed of a rubber material.

Preferably, the mounting cap is provided with a seating guide step for guiding a fitment of an upper portion of the sub-housing on the mounting cap. The seating guiding step is concentrically formed with the exhaust hole, and the upper portion of the sub-housing is forcedly fitted in the seating guiding step.

It is to be understood that both the foregoing general description and the following detailed description of the present invention are exemplary and explanatory and are intended to provide further explanation of the invention as claimed.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
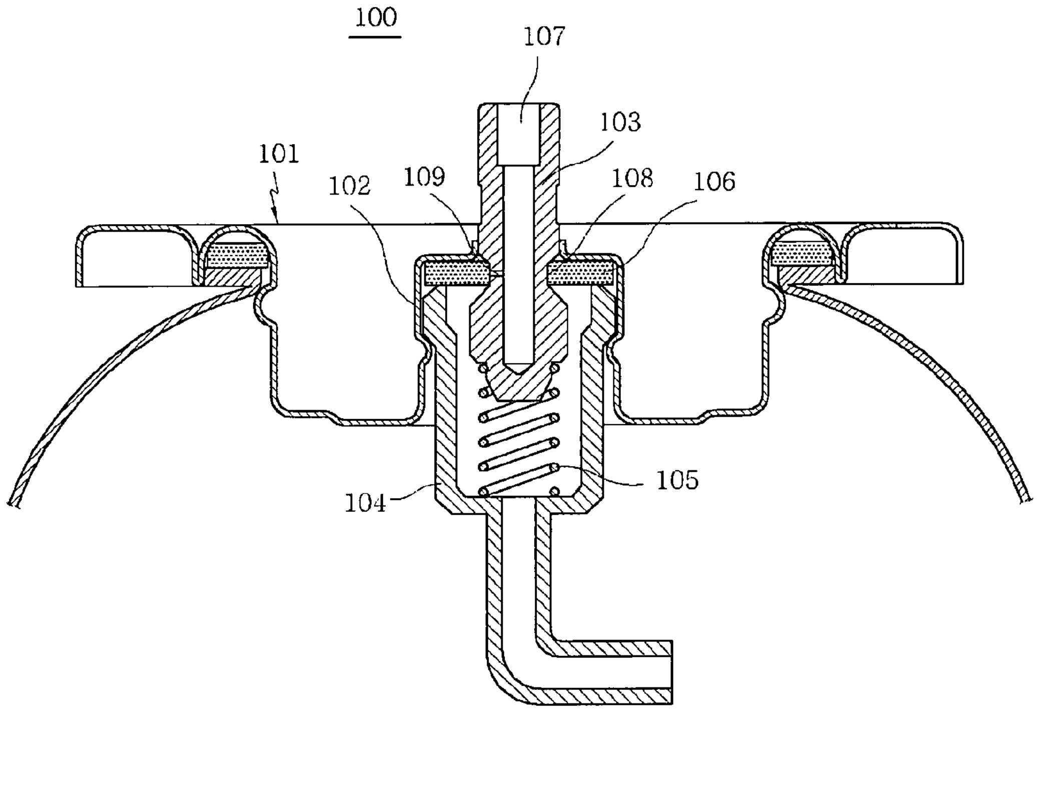
FIG. 1 (PRIOR ART)
FIG. 1 is a sectional view of a conventional gas fuel container.
Figure 2:
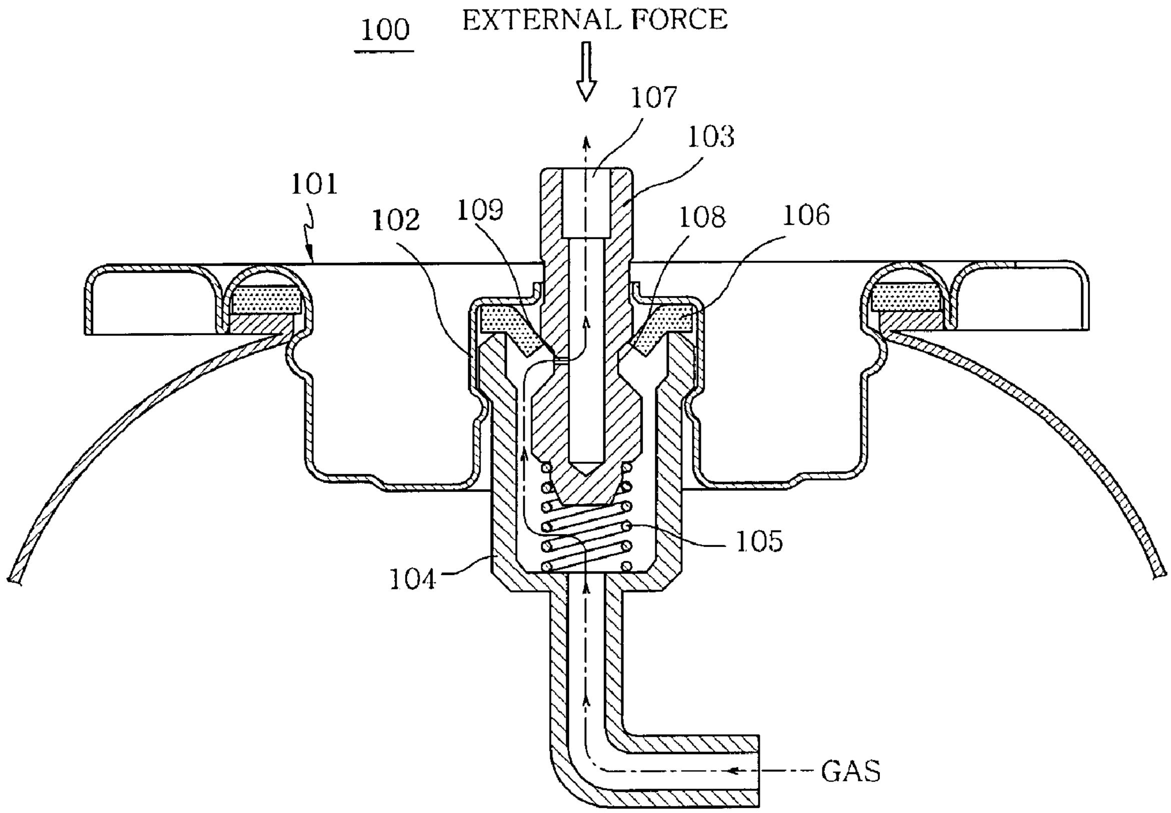
FIG. 2 (PRIOR ART)
FIG. 2 is a sectional view illustrating a gas spraying state of a conventional gas fuel container depicted in FIG. 1.
Figure 3:
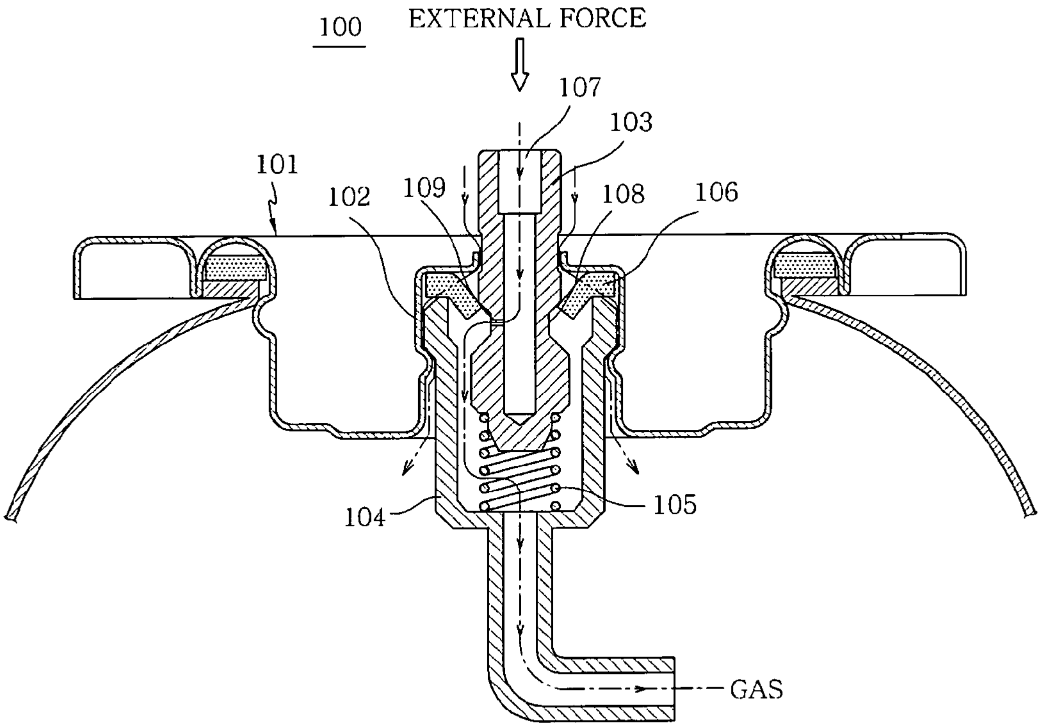
FIG. 3 (PRIOR ART)
FIG. 3 is a sectional view illustrating a gas filling state into a conventional gas fuel container depicted in FIG. 1.
Figure 4:
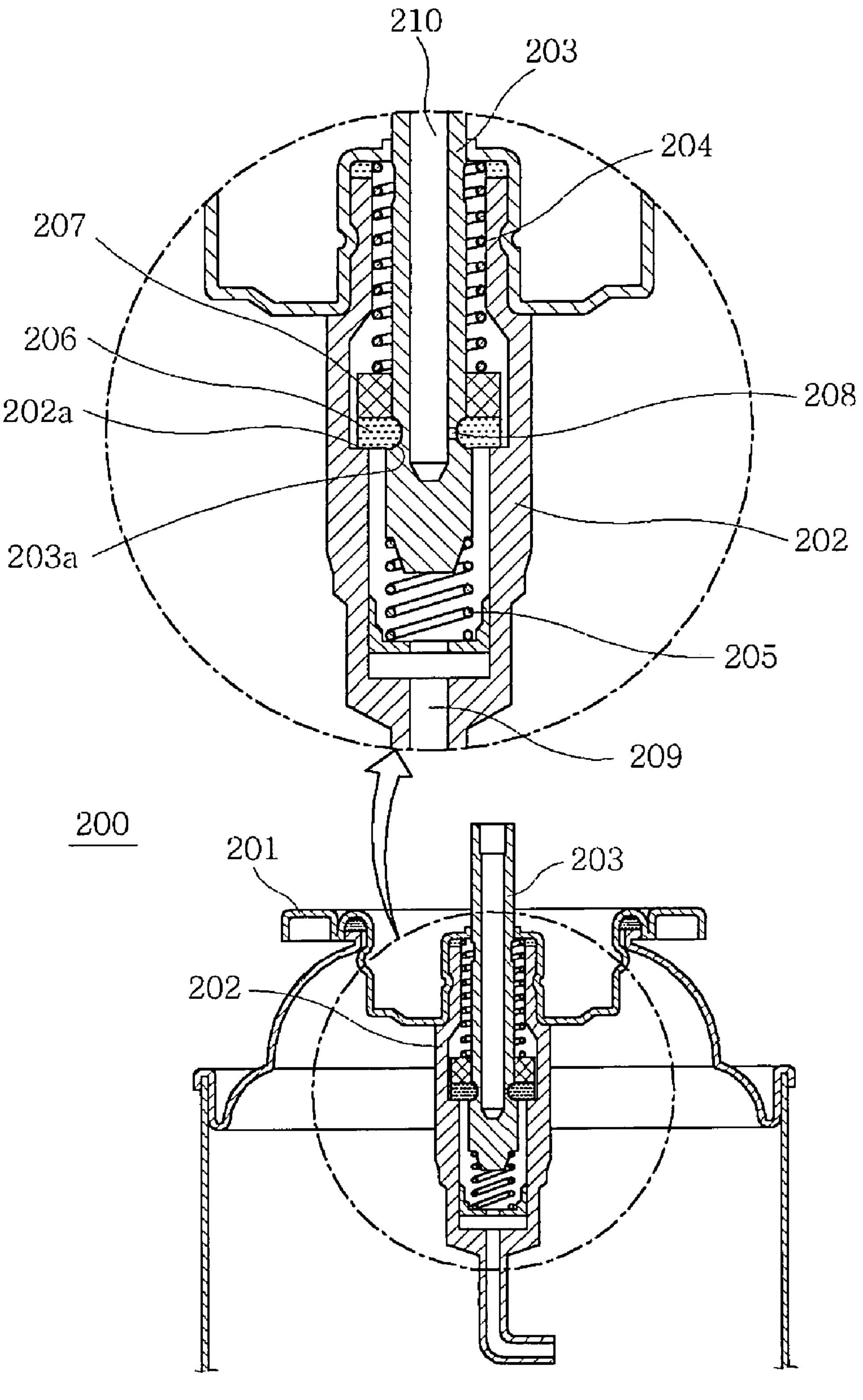
FIG. 4 (PRIOR ART)
FIG. 4 is a sectional view of a safety apparatus of a conventional gas fuel container.
Figure 5:
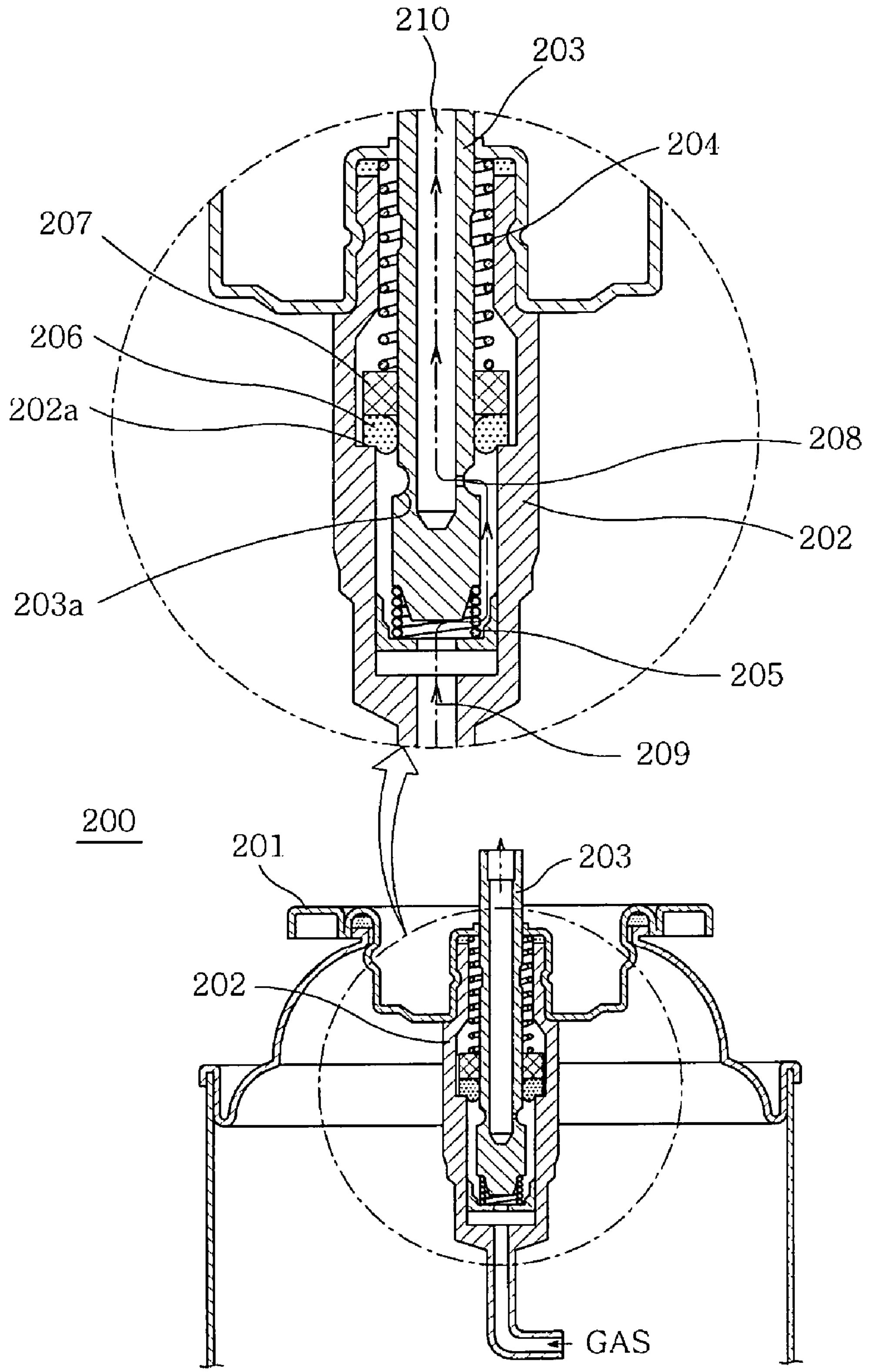
FIG. 5 (PRIOR ART)
FIG. 5 is a sectional view illustrating a gas spraying state of a safety apparatus depicted in FIG. 4.
Figure 6:
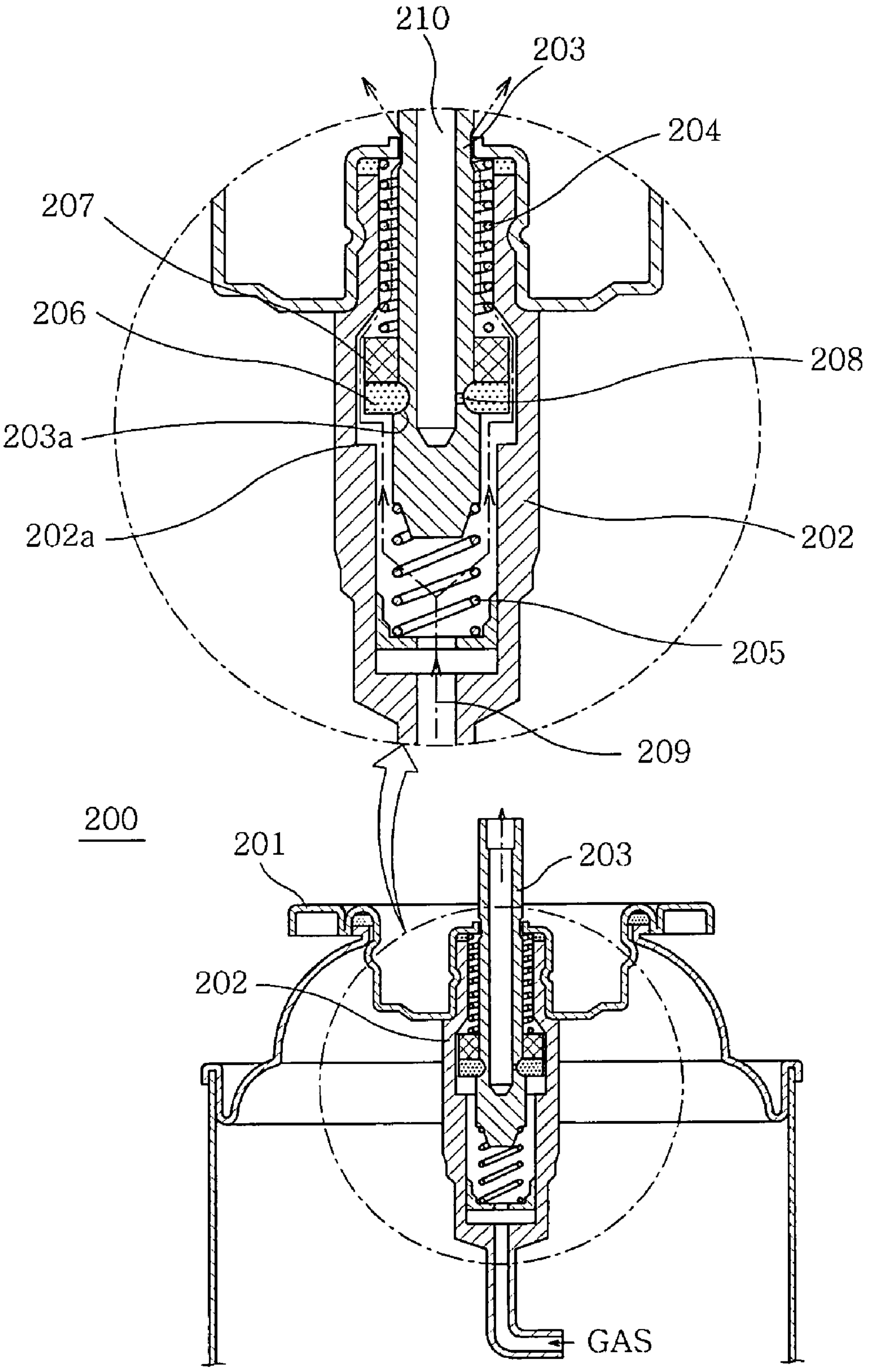
FIG. 6 (PRIOR ART)
FIG. 6 is a sectional view illustrating an operation state of a safety apparatus depicted in FIG. 4 when internal pressure is increased above a predetermined level.
Figure 7:
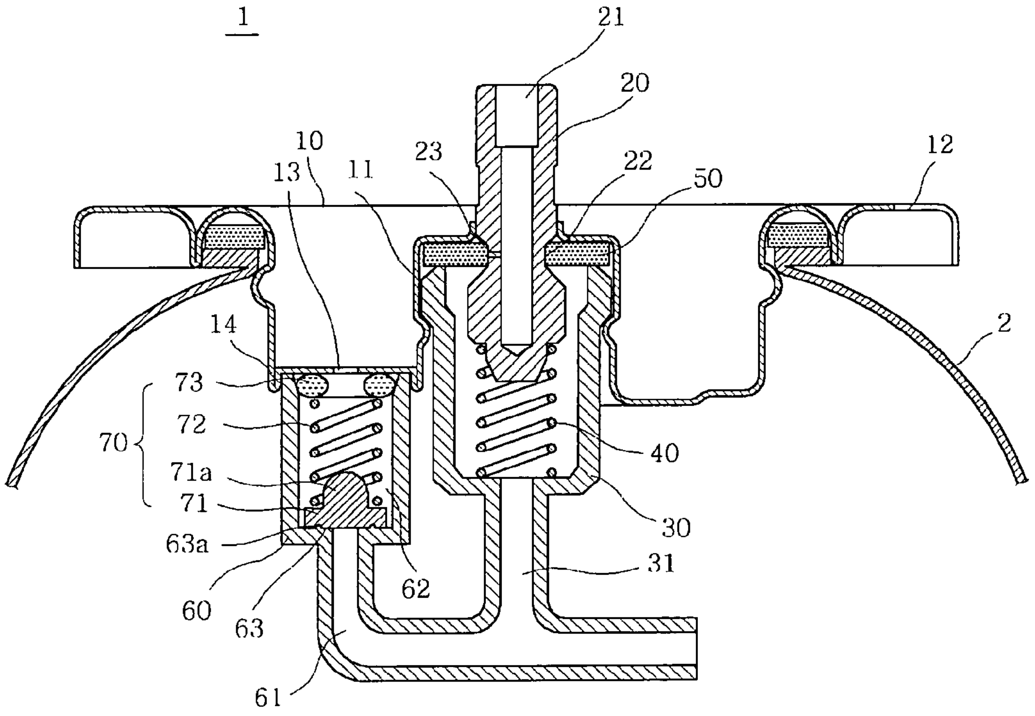
FIG. 7 is a sectional view illustrating a safety apparatus of a gas fuel container according to a preferred embodiment of the present invention.
Figure 8:
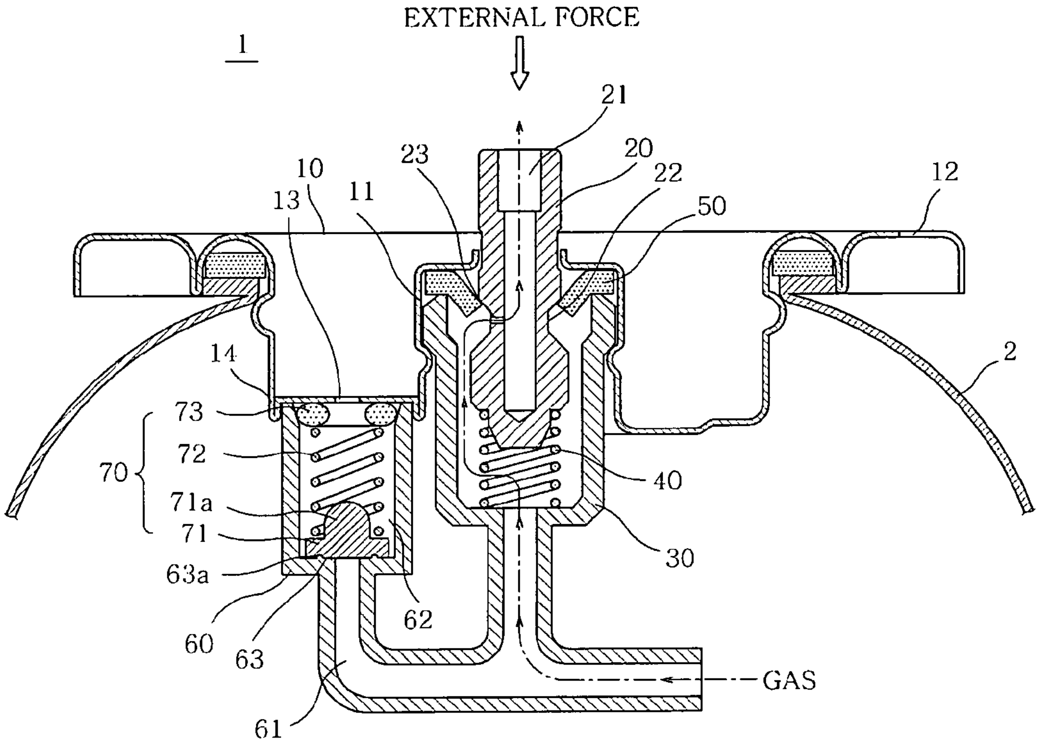
FIG. 8 is a sectional view illustrating an operation state under a regulated pressure of a safety apparatus depicted in FIG. 7.
Figure 9:
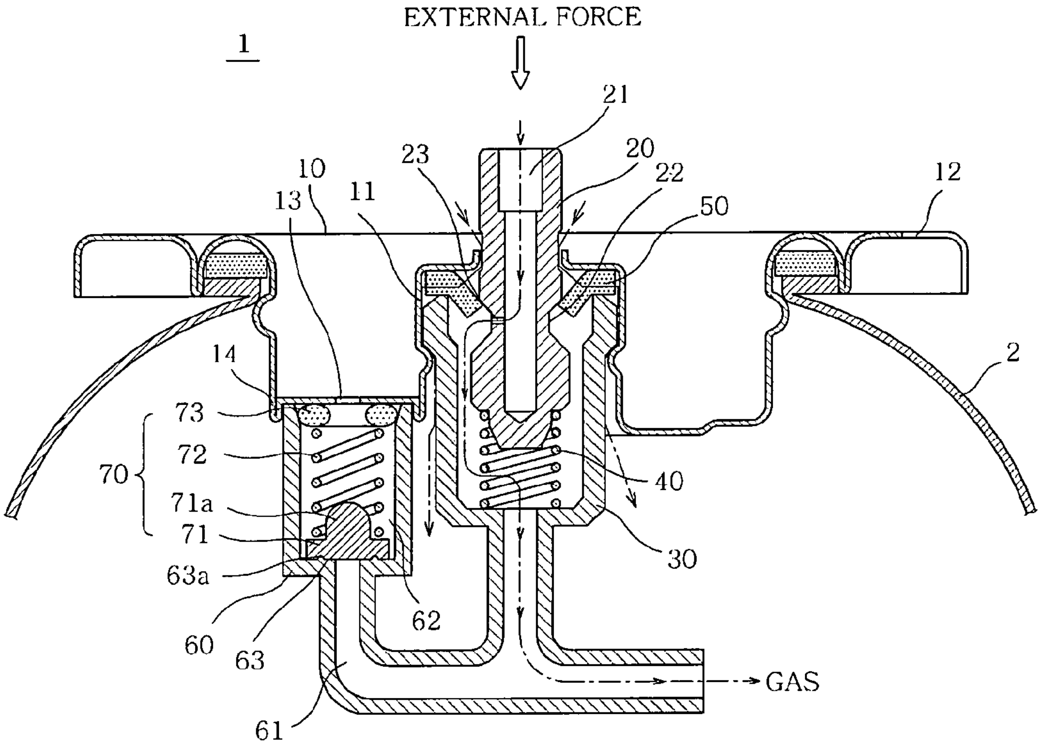
FIG. 9 is a sectional view of a fuel gas filling state into a fuel gas container depicted in FIG. 7.
Figure 10:
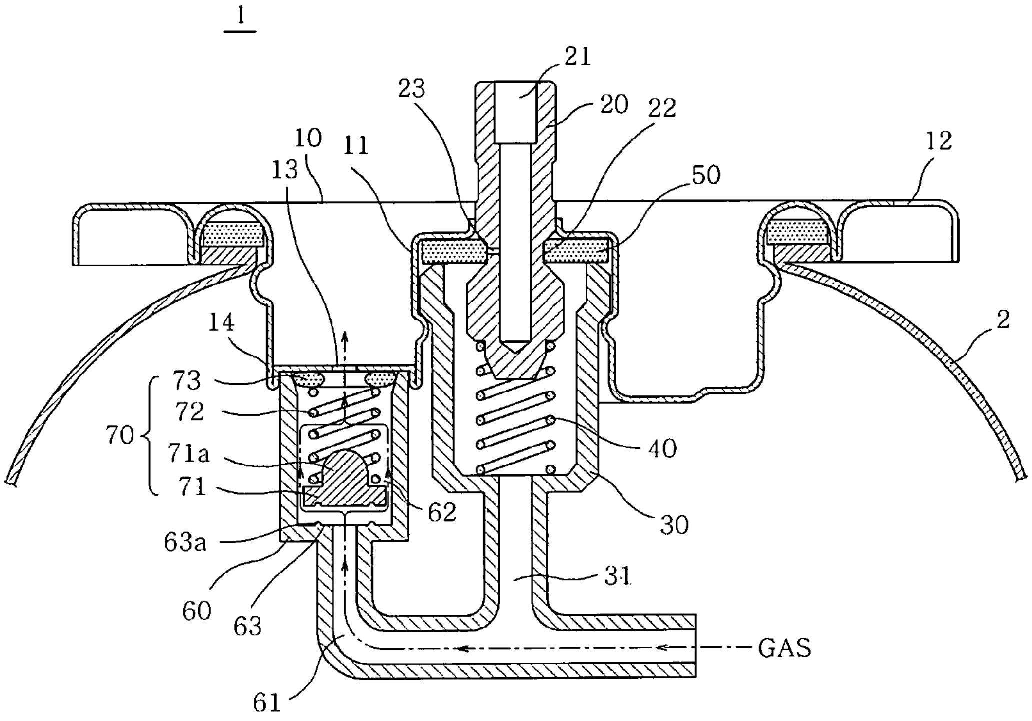
FIG. 10 is a sectional view illustrating an operation state of a safety apparatus depicted in FIG. 4 when internal pressure is increased above a predetermined level.
Figure 11:
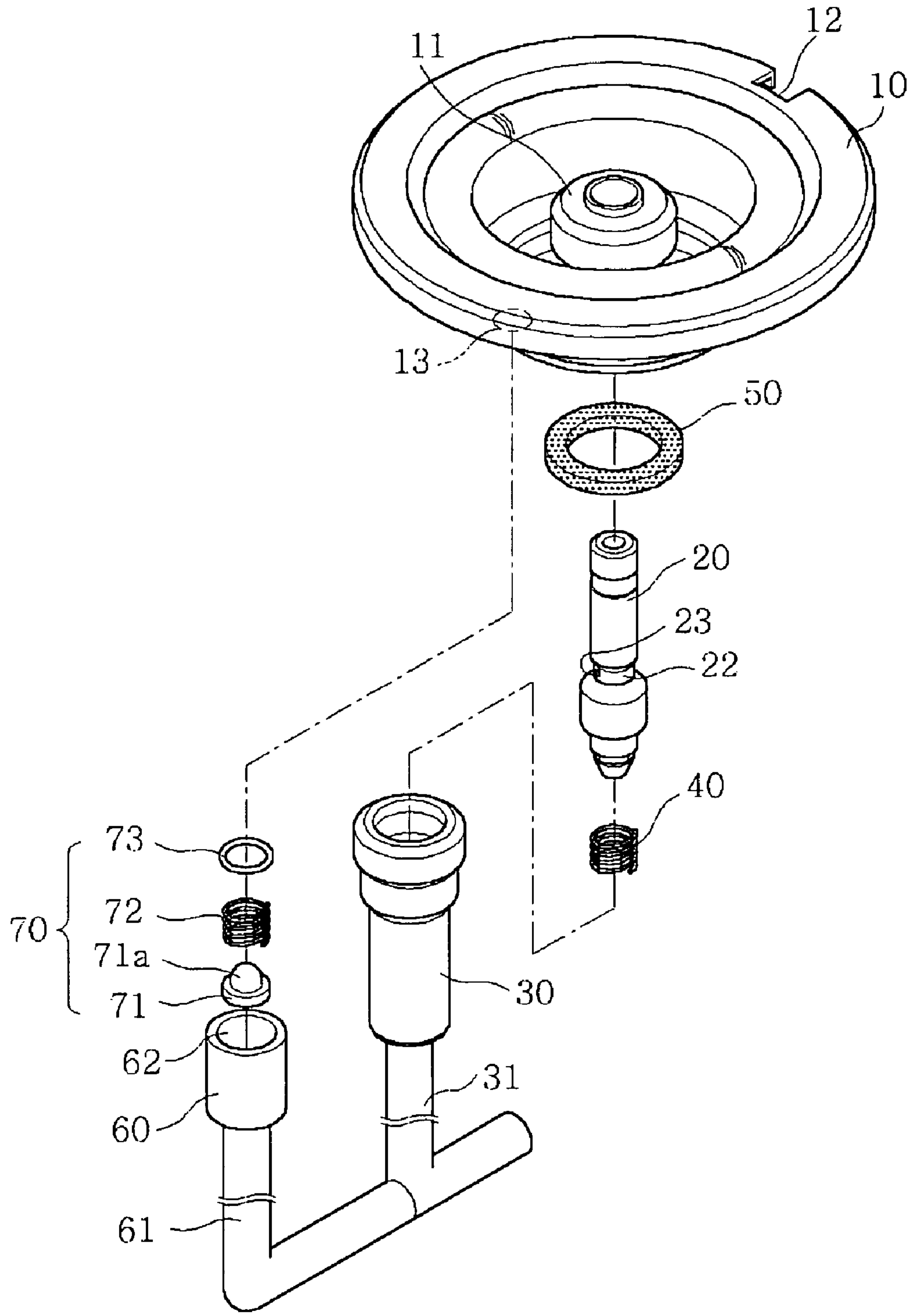
FIG. 11 is a partial exploded perspective view of a safety apparatus of a gas fuel container according to a preferred embodiment of the present invention.

FIG. 7 is a sectional view illustrating a safety apparatus of a gas fuel container according to a preferred embodiment of the present invention, FIG. 8 is a sectional view illustrating an operation state under a regulated pressure of a safety apparatus depicted in FIG. 7, FIG. 9 is a sectional view of a fuel gas filling state into a fuel gas container depicted in FIG. 7, FIG. 10 is a sectional view illustrating an operation state of a safety apparatus depicted in FIG. 7 when internal pressure is increased above a predetermined level, and FIG. 11 is a partial exploded perspective view of a safety apparatus of a gas fuel container according to a preferred embodiment of the present invention.

As shown in the drawings, a mounting cap 10 is coupled on a top of a body 2 of a gas fuel container 1. The mounting cap 10 is provided at a center with a coupling portion 11 in which a valve stem 20 and a main housing 30 are coupled. Coupled in the main housing 30 is a spring 40 for biasing the valve stem 20 upward. An opening/closing seal 50 is tightly disposed between a top of the main housing 30 and the coupling portion 11 of the mounting cap 10.

The mounting cap 10 is provided at a periphery with a locking groove 12 that can be interlocked with a gas burner in use. The mounting cap 10 is further provided at a portion between the coupling portion 11 and the locking groove 12 with an exhaust hole 13 through which over pressure gas can be exhausted.

The mounting cap 10 is manufactured through a stroke of a drawing/cutting process using a conventional progressive die set. The exhaust hole 13 can be easily formed using a boring machine without changing a design of the conventional progressive die set.

A lower portion of the main housing 30 is bent in an elbow-shape and is provided with a gas introducing passage 31. The reason why the lower portion of the main housing 30 is bent in the elbow-shape is to effectively exhaust gas vaporized and collected on an upper layer of the container body 2 when the container 1 is used in a state where it is laid on a portable gas burner.

An upper portion of the valve stem 20 is inserted in the coupling portion 11 by penetrating the mounting cap 10 and a lower portion thereof is disposed in the main housing 30 to be biased by the spring 40 upward. A gas spraying hole 21 is defined by an upper-inner cavity of the valve stem 20. A circumferential concave portion 22 is formed on an outer circumference of the valve stem 20, and an orifice 22 is formed on the concave portion 22 in a horizontal direction. The opening/closing seal 50 is tightly fitted around the concave portion 22 to block the orifice 23.

Meanwhile, a sub-housing 60 is integrally formed with a lower end of the main housing 30. A safety valve 70 operated in response to internal pressure of the container 1 is installed in the sub-housing 60.

The sub-housing 60 is provided at a lower portion with a branch line 61 communicating with the gas introducing passage 31. The sub-housing 60 is further provided with a receiving cavity 62 having an upper portion communicating with the exhaust hole 13 formed on the mounting cap 10 and a lower portion communicating with the branch line 61.

It is preferable that the main housing 30 and the sub-housing are integrally formed of synthetic resin through an injection molding process.

A safety valve 70 is installed in the receiving cavity 61 of the sub-housing 60. The safety valve 70 is designed to be opened when the internal pressure of the container 1 is increased to be higher than a predetermined level and to be closed when it is lower than the predetermined level.

The safety valve 70 includes an opening/closing member 71 installed on a bottom of the receiving cavity 62 to selectively open the branch line 61, an elastic member 72 installed in the receiving cavity 62 and seated on the opening/closing member 71, and a seal ring 73 disposed on a top of the receiving cavity 62 and inserted between a top of the elastic member 72 and the mounting cap 10.

The elastic member 72 is preferably formed of a spring; further preferably a cylindrical coil spring.

The opening/closing member 71 is designed having a flat bottom and is provided at an upper portion with a supporting boss 71*a*. A lower end of the elastic member 72 is inserted around the supporting boss 71*a* of the opening/closing member 71. Therefore, it can be avoided that the elastic member 72 is deformed in a lateral direction against compression force applied in a longitudinal direction.

The seal ring 73 disposed between the top of the elastic member 72 and the mounting cap 10 is formed of a deformable rubber material to provide a seal between a top of the sub-housing 60 and the mounting cap 10, thereby preventing the internal gas from leaking out of the container 1.

A lower end of the seal ring 73 is biased by the elastic member 72 to tightly contact a bottom of the mounting cap 10 around the exhaust hole 13.

A circular projection 63*a* is formed on a bottom surface 63 of the sub-receiving cavity 62 defined in the sub-housing 60. A diameter of the circular projection 63*a* is greater than an inner diameter of the branch line 61. Therefore, when the branch line 61 is closed by the opening/closing member 71, the opening/closing member 71 tightly contacts the circular projection 63*a*, enhancing the seal effect.

The mounting cap 10 is provided with a seating guide step 14 in which the top of the sub-hosing 60 is inserted. The seating guide step 14 guides an assembly of the sub-housing 60 and prevents the sub-housing 60 from displacing.

The seating guide step 14 is preferably designed to be concentrically formed with the exhaust hole 13 such that the sub-housing 60 is forcedly fitted in the seating guide step 14.

The operation of the safety apparatus of the present invention will be described hereinafter.

In normal use, when the valve stem 20 is pushed downward by external force to spray gas out of the gas fuel container 1, while the spring 40 is compressed as shown in FIG. 8, the orifice 23 is opened by the opening/sealing seal 50.

Accordingly, the gas filled in the container is sprayed out of the container along an arrow, that is, via the gas introducing passage 31, the inner cavity of the main housing 30, the orifice 23 of the valve stem 20, and the gas spraying hole 21.

When a user intends to fill the container 1 with gas, the flow of gas is realized in an opposite direction of the spraying process.

That is, as shown in FIG. 9, 20% of the gas being filled in the container 1 is realized through the above mentioned gas exhaust path and 80% is filled in the container via the cavity of the main housing 30 and the gas introducing passage 31 after it is introduced through a gap between the coupling portion 11 of the mounting cap 10 and the main housing 30. Therefore, the filling efficiency is not deteriorated, not being affected by the safety apparatus of the present invention.

When the external force applied to the valve stem 20 is released, the valve stem 20 is returned to its initial position by the biasing force of the spring 40, whereby the opening/closing seal 50 is also returned to its initial position to close the orifice 23 of the valve stem 20, interrupting the exhaust of the gas.

Meanwhile, when internal pressure of the container 1 is increased to be higher than the elastic force (14 $kg_f/cm^2$ for a butane gas container) when the container 1 is being used for the gas burner or is in a separated state from the gas burner, as shown in FIG. 10, the gas pressure acting on the bottom of the opening/closing member 71 through the branch line 61 compresses the elastic member 72 so that the opening/closing member 71 can be spaced away from the bottom surface 63.

As a result, the excessive internal pressure in the gas fuel container 1 is exhausted to an external side through the branch line 61, a gap defined between the opening/closing member 71 and the bottom surface 63, a cavity of the sub-housing 60, and the exhaust hole 13, thereby reducing the internal pressure to prevent the explosion of the gas fuel container 1 that may be caused by the overpressure.

After the above, when the internal pressure is reduced to the standard value, the opening/closing member 71 is restored to its initial position by a biasing force of the elastic member 72 to tightly contact the bottom surface 63 of the sub-housing 60. As a result, the branch line 61 is blocked by the opening/closing member 71 to prevent the gas in the container 1 from needlessly exhausting.

It will be apparent to those skilled in the art that various modifications and variations can be made in the present invention. Thus, it is intended that the present invention covers the modifications and variations of this invention provided they come within the scope of the appended claims and their equivalents.

As described above, in the safety apparatus of the present invention, when internal pressure of the gas fuel container is increased above a predetermined level, the over pressure can be released out of the container by the safety valve, preventing the deformation or explosion of the gas fuel container.

In addition, when the internal pressure is reduced to a standard value, the safety valve is restored to its initial position to prevent the gas in the container from needlessly exhausting.

Furthermore, since the safety valve is designed not affecting the conventional structure, the filling efficiency is not deteriorated. That is, a conventional valve stem is not changed in its design and an additional sub-housing for installing a safety valve is simply added, thereby avoiding the trouble of design change and reducing the manufacturing costs.

Furthermore, the gas fuel container with the inventive safety apparatus is designed to use an existing filling line for the gas fuel container not having the safety apparatus. Therefore, there is no need for changing a manufacturing line for the gas fuel container products.

What is claimed:

1. An overpressure safety apparatus of a gas fuel container having a container body and a mounting cap mounted on a top of the container, the safety apparatus comprising:

a main housing coupled to the mounting cap, the main housing having an elbow-shaped gas introducing passage;

a valve stem disposed in the main housing through the mounting cap and biased by a first spring disposed in the main housing, the valve stem being provided with an orifice;

an opening/closing seal inserted between a top of the main housing and the mounting cap to selectively open/close the orifice of the valve stem;

a sub-housing connected to a bottom of the main housing, the sub-housing having a branch line communicating with the gas introducing passage and a receiving cavity with a bottom communicating with the branch line and a top communicating with an exhausting hole formed on the mounting cap; and a safety valve disposed in the receiving cavity to selectively open the branch line in response to variation of internal pressure of the container, wherein the mounting cap is provided with a seating guide step for guiding a fitment of an upper portion of the sub-housing to the mounting cap.

2. The safety apparatus of claim 1, wherein the safety valve comprises an opening/closing member installed on the bottom of the receiving cavity to selectively open the branch line, a second elastic member installed in the receiving cavity and seated on the opening/closing member, and a seal ring disposed on the top of the receiving cavity and inserted between a top of the second elastic member and the mounting cap.

3. The safety apparatus of claim 2, wherein the second elastic member is a cylindrical coil spring.

4. The safety apparatus of claim 2, wherein the opening/closing member is provided at a top with a supporting boss for supporting a lower end of the second elastic member to prevent the second elastic member from deforming in a lateral direction.

5. The safety apparatus of claim 2, wherein the seal ring is formed of a rubber material.

6. The safety apparatus of claim 1, wherein the sub housing is provided at an inner bottom surface thereof with a circular projection having a diameter larger than an inner diameter of a relief hole.

7. The safety apparatus of claim 1, wherein the seating guiding step is concentrically formed with the exhaust hole, and the upper portion of the sub-housing is forcedly fitted in the seating guiding step.

8. An overpressure safety apparatus of a gas fuel container having a container body and a mounting cap mounted on a top of the container, the safety apparatus comprising:

a sub-housing connected to a bottom of a main housing of the container body, the sub-housing having a branch line-communicating with a gas introducing passage and a receiving cavity with a bottom communicating with the branch line-and a top communicating with an exhausting hole formed on the mounting cap; and a safety valve disposed in the receiving cavity to selectively open the branch line-in response to variation of internal pressure of the container, wherein the mounting cap is provided with a seating guide step for guiding a fitment of an upper portion of the sub-housing to the mounting cap.

9. The safety apparatus of claim 8, wherein the safety valve comprises an opening/closing member installed on the bottom of the receiving cavity to selectively open the branch line, a second elastic member installed in the receiving cavity and seated on the opening/closing member, and a seal ring disposed on the top of the receiving cavity and inserted between a top of the second elastic member and the mounting cap.

10. The safety apparatus of claim 9, wherein the second elastic member is a cylindrical coil spring.

11. The safety apparatus of claim 9, wherein the opening/closing member is provided at a top with a supporting boss for supporting a lower end of the second elastic member to prevent the second elastic member from deforming in a lateral direction.

12. The safety apparatus of claim 9, wherein the seal ring is formed of a rubber material.

13. The safety apparatus of claim 8, wherein the sub housing is provided, at an inner bottom surface thereof, with a circular projection having a diameter larger than an inner diameter of a relief hole.

14. The safety apparatus of claim 8, wherein the seating guiding step is concentrically formed with the exhaust hole, and the upper portion of the sub-housing is forcedly fitted in the seating guiding step.

* * * * *